2,991,510
REGENERATED CELLULOSE FILM AND PROCESS

Henry Gilbert Ingersoll, Hockessin, Del., assignor to E. I. du Pont de Nemours and Company, Wilmington, Del., a corporation of Delaware
No Drawing. Filed Aug. 25, 1958, Ser. No. 757,094
8 Claims. (Cl. 18—57)

This invention relates to regenerated cellulose films. More particularly, it relates to a process of producing regenerated cellulose films of outstanding toughness and durability.

This application is a continuation-in-part of my copending application Serial No. 474,424, filed August 2, 1954, and now abandoned.

Regenerated cellulose film is industrially produced by the well-known wet regeneration process involving the casting of viscose which has been given the normal degree of ripening, i.e., which has reached a salt index of about 2 to 5, into a sulfuric acid-sodium sulfate coagulating and regenerating bath. The film so obtained has achieved outstanding commercial success. Nevertheless, major improvements in the tear resistance and durability of regenerated cellulose films, especially under conditions of low temperature and low humidity, would represent a marked advance in the art and open new fields of use. The trade has long recognized the need for a regenerated cellulose sheet characterized by high tear resistance, high durability under cold, dry conditions even without a softener and good clarity. Methods of achieving these goals have been proposed (United States Patent Nos. 2,445,333 and 2,451,768); but, notwithstanding their technical merits, these methods involve considerable departures, as regards equipment and procedures, from the accepted plant techniques. No process has been proposed whereby these desirable goals can be achieved through a wet regeneration process using conventional industrial equipment and requiring no drastic changes in materials and procedures.

An object of this invention, therefore, is to provide for the production of regenerated cellulose film having high tear resistance, high durability under low temperature and low humidity conditions and good clarity. Another object is to provide a process for producing the aforesaid improved regenerated cellulose film, which process may be carried out in existing equipment for the manufacture of regenerated cellulose film by the conventional wet regeneration technique. The above and other objects will more clearly appear from the description which follows.

These objects are realized by the present invention which, briefly stated, comprises casting viscose containing from about 7% to about 10% cellulose prepared with from about 35% to about 50% carbon disulfide based on the weight of the dry cellulose, and having a salt index between about 10 and about 15, into a coagulating, non-regenerating, ammonium or alkali metal salt bath buffered to a pH of at least 3, regenerating without substantially stretching the resulting gel film by exposing it to the action of an acid-salt bath, and thereafter desulfuring, washing and drying the film in the usual manner whereby to produce a film having good clarity, and further characterized by high tear resistance and enhanced durability under low temperature and humidity conditions.

It was quite surprising to find that viscoses of high xanthate substitution, i.e., high salt index, could be made to give films of exceptional toughness and durability and good clarity, since high xanthate viscoses, when coagulated in the acid-salt baths usually used for cellophane casting, characteristically give hazy bubbled films of inferior quality. Unripened viscoses, i.e., viscoses of salt index of about 7 or higher, have generally been considered unsuitable by the regenerated cellulose film industry, even though they offer the advantage that the time normally required for ripening is decreased or eliminated.

In order to prepare a viscose having the required amount of xanthate groups, it is necessary that the alkali cellulose be reacted with a higher than normal quantity of carbon disulfide. It has been found that the minimum quantity of carbon disulfide required for good results is about 35%, based on the weight of the bone-dry cellulose. The maximum amount of carbon disulfide giving films having the desired combination of properties is about 50%. The optimum amount of carbon disulfide depends to some extent on the procedure used to xanthate the alkali cellulose. When xanthation is carried out in a closed system, in which case substantially all of the carbon disulfide reacts with the alkali cellulose, the best results are obtained by using not above 45%, and preferably between 38% and 42%, of carbon disulfide based on the dry cellulose. When xanthation is carried out in vented systems, and is generally done in industrial practice, an appreciable portion of the carbon disulfide does not react. In this case, it is desirable to use above 40%, preferably between 42% and 48%, of carbon disulfide based on the dry cellulose. Another method of arriving at the proper degree of critical xanthation consists in determining the amount of xanthate sulfur at a given time early in the process. This time is chosen for convenience at 2½ hours after completion of the mixing cycle. For the best results, there should be at that time between about 2.0% and 2.6% of xanthate sulfur in the viscose.

It is further necessary that the viscose be only partly ripened prior to casting. The degree of ripening (i.e., of loss of xanthate groups by decomposition) is expressed by the salt index of the viscose, which decreases as the degree of ripening increases. The maximum degree of ripening suitable for the purpose of this invention corresponds to a salt index of about 10 (determined as specified in Reinthaler-Rowe "Artificial Silk," 1928, page 69), since with more highly ripened (lower salt index) viscoses the durability and toughness of the resulting films fall off and approach the values possessed by conventional cellophane films. The minimum suitable degree of ripening corresponds to a salt index of about 15. It has been found that viscoses having a higher salt index, i.e., slightly ripened viscoses, give films which are hazy or even opaque because of internal voids. Thus, it will be seen that the viscose should be ripened to a predetermined and narrow range for the purpose of this invention. The optimum salt index depends to some extent on other variable factors such as alkali concentration or cellulose concentration and therefore cannot be stated with rigorous precision. Also, the ripening time, as is known, depends on the carbon disulfide concentration, at the lower range of which (about 35% $CS_2$) only a very short ripening time is necessary to reach the required salt index range, while with viscoses prepared with a higher carbon disulfide concentration the ripening time must be increased correspondingly. In most cases, however, the best results are obtained at salt indices between 11.5 and 13. When the casting is done continuously, e.g., in a conventional cellophane casting machine where the viscose must coagulate rapidly as an unsupported film, it is desirable, in order to operate at a practical speed, that the salt index be not more than about 12.5. Higher salt indices can be used when the casting is batchwise, e.g., on plates, or where the continuously cast film is supported, for example, on a belt or wheel. Films from viscoses of salt index between 13 and 15 sometimes show an external (surface) haze, but this can be substantially removed by coating the film with a liquid having about the same refractive index as the cellulose, e.g., with one of the usual moistureproofing lacquers.

Provided the above described critical conditions are observed, the viscose used in the process of the invention may be of a variety of types and compositions. For example, it may be made from wood pulp, cotton linters, mixtures of the two or even other types of cellulose. It may have a cellulose content of from about 7% to about 10% and an alkali content of from 4% to 10% or even more. The standard viscoses of the cellophane industry, i.e., those having between 8% and 9% of cellulose and between 5% and 6% alkali, are preferably used. Viscoses having high cellulose contents, e.g., from 10% to 14%, can be used. They give films of excellent properties, and even have the advantage that the degree of ripening is less critical in that with such viscoses the salt index can be as low as about 5. However, these high cellulose viscoses have the disadvantage that their high viscosity creates special problems of deaerating and handling and necessitates special plant procedures. Therefore, the specific usefulness of this invention lies in the use of viscoses of normal or moderate viscosities, which in general are viscoses containing not more than 10% cellulose, since such viscoses can be handled without changes in established plant practices.

In accordance with the process of this invention, the coagulating of the viscose as a gel film and the regeneration of the cellulose therefrom are carried out in two separate baths, the first of which is a coagulating bath having substantially no regenerating action, i.e., a bath which does not decompose the cellulose xanthate, and the second of which is a regenerating bath. The use of this two-bath system is essential, since it has been found that the use of baths of pH in the acid range, e.g., 1–2, having both a coagulating and regenerating action, with highly xanthated viscoses leads to films either lacking the desired durability and toughness, or having a bubbly, irregular appearance, or both.

The first, or coagulating but non-regenerating bath, should have a pH of at least 3, and preferably at least 5. The pH of this bath may be as high as 10 or even higher, a preferred pH range being 7–9 for the optimum combination of film properties. This first bath is an aqueous buffer solution. The term "buffer," in accordance with accepted definitions, refers to a substance, or combination of substances, which when dissolved in water produces a solution which resists a change in its hydrogen ion concentration upon the addition of acid or alkali. A number of such pH regulating systems have been described in the chemical literature for both the low pH range, between about 3 and 7, and the high pH range, above 7. Suitable ones for use in the coagulating bath include the water-soluble ammonium, sodium and potassium salts of inorganic or organic acids, for example, alone or in combination, sodium hydrogen sulfate, sodium dihydrogen phosphate, sodium hydrogen phthalate, sodium borate, mixtures of sodium hyrdoxide and sodium dihydrogen phosphate, ammonium phosphate, trisodium phosphate, potassium sulfate, sodium bisulfite, sodium and ammonium bicarbonate, ammonium sulfate and the like, the last named being a preferred ingredient. The concentration of the coagulating bath is not critical, provided it is sufficient to effect rapid coagulation of the viscose, a concentration varying from about 25% of the buffering agent to saturation being normally preferred. The coagulating bath may be at any temperature from room temperature to about 75° C. and, preferably, in the range between 30° and 75° C. In continuous casting, the optimum temperature range is that between about 30 and about 50° C. Addition to the coagulating bath of salts of heavy metals, i.e., metals having a specific gravity above 4, such as zinc sulfate or iron sulfate, should be avoided, since the presence of heavy metal salts in more than minute amounts leads to bubbled films of inferior quality.

The regenerating bath can be any of the conventional acid-salt baths used in the cellophane industry. Preferably, it is a sulfuric acid-sodium sulfate bath containing from 4% to 12% of sulfuric acid and from 13% to 30% of sodium sulfate, although other acids such as phosphoric acid and other salts such as ammonium sulfate or magnesium sulfate can be used. The regenerating bath can be at any desired temperature up to the boiling point, a preferred range being 40 to 75° C. After regeneration, the film is purified, i.e., desulfured and washed, in the usual manner.

Any suitable casting technique may be employed to form the film such as plate casting or the conventional machine casting in which the viscose is extruded from a hopper directly into the coagulating bath and then transported by means of rolls through regenerating and finishing baths.

It is desirable in machine casting to have an anionic wetting agent present in the coagulating bath, since this has been found useful to prevent the formation of streaks in the film. The anionic wetting agent is preferably used in amount sufficient to reduce the surface tension of the coagulating bath to about 30 dynes/cm. Normally, this will require between about 0.03% and 0.2%, by weight, of wetting agent. Suitable anionic wetting agents include, for example, the sodium salts of long chain hydrocarbon sulfonates, ammonium oleate, the sodium salt of sulfated oleic acid, the oleic acid esters of sulfonated aliphatic alcohols, sodium carboxymethylcellulose, the various arylalkyl sodium sulfonates, the ammonium salts of the naphthalene sulfonic acid-formaldehyde condensation products, the long chain aliphatic alcohol sulfates, sodium lignin sulfonate, sulfonated castor oil, and the like.

The regenerated cellulose films obtained by the process of this invention can, if desired, be subjected to the usual aftertreatments such as softening and coating with moistureproofing and/or heat-sealing coats.

The following specific examples further illustrate the principles and practice of the present invention:

The various viscoses used in Examples I–VIII were prepared according to the following procedure: Alkali cellulose was prepared from the stated percentages of cellulose (generally wood pulp) and sodium hydroxide, then aged to get the desired viscose viscosity (40–60 poises). It was then xanthated in a closed system for 1.5 to 3 hours, depending upon the amount of carbon disulfide employed (35–45%, based on the recoverable bone-dry cellulose). The xanthate crumbs were dissolved in an aqueous solution of sodium hydroxide by mixing one hour at an internal temperature of about 15° C. The freshly prepared viscose was filtered cold, deaerated, then aged at 0° C. or 18° C. until it had reached the indicated salt index, i.e., a salt index less than about 15 but above about 10, and preferably in the neighborhood of 12. In all examples, the stated sodium hydroxide content refers to the total alkalinity expressed as sodium hydroxide. The use of a small amount of an anionic wetting agent in the viscose is desirable in plate casting, as this tends to avoid the formation of pin holes in the film when the viscose is cast. In Examples I–VIII below, there was used 0.1%, by weight of the viscose, of the sodium salt of sulfated ricinoleic acid for that purpose.

The viscose was cast into a film about 0.001″ thick by spreading it on a glass plate with a stainless steel bar, then immersing the plate for three minutes in a coagulating bath having substantially no regenerating action. In some of the examples, this bath was an aqueous 40% ammonium sulfate solution maintained at 50° C. In others, it was a disodium monohydrogen phosphate-monosodium dihydrogen phosphate bath, also at 50° C. The film was then immersed in a regenerating bath for three minutes. In the examples, this bath was an aqueous solution of 10% sulfuric acid and 25% sodium sulfate, held at 50° C. Finally, the gel film of regenerated cellulose was washed free of salts, clamped on a chrome-plated steel plate and dried.

In all cases, the tear strength, flex life and impact strength values set forth in the examples were determined by the methods described by D. W. Flierl in an article entitled "Methods of Rating Film Durability" in the November 1951 issue of Modern Packaging. The flex values were determined with a stroke length of ⅛ inch and at the rate of 150 strokes per minute. The impact strength was determined either by the falling ball impact tester (2½" diameter ball, 2 meters fall) or by means of the pendulum impact tester. In the latter case, the tests were carried out with an apparatus based on the principles set forth in the article mentioned above, but slightly modified to permit the use of smaller film samples. The numerical values for dry tear strength shown refer to films of 1 mil in thickness. When the film obtained experimentally is near to but not exactly 1 mil thick, the observed values can be corrected to the dry tear strength corresponding to 1 mil by using the following relationship:

Corrected dry tear (1 mil basis)

$$= \frac{0.6 \times \text{measured dry tear (in grams)}}{\text{measured thickness (mils)} - 0.4}$$

EXAMPLE I

A regenerated cellulose film was made from a viscose containing 8.5% cellulose and 5.25% total sodium hydroxide, prepared using 40% carbon disulfide based on the bone-dry cellulose. This viscose was cast at a salt index of 13.5 in a 40% ammonium sulfate aqueous bath (pH 8) at 50° C.; then the coagulated film was regenerated in a 10% sulfuric acid-25% sodium sulfate bath at 50° C. In the table which follows, some of the properties of this film (designated as HX, for high xanthate) are compared with the corresponding properties of (a) an experimental film designated as "Laboratory Control," prepared from a viscose having the normal carbon disulfide content (8.5% cellulose, 5.25% alkali, 28.2% carbon disulfide) cast at the normal salt index, 2.4, into the same two-bath system; and (b) a film designated as "Commercial Control A," which was a commercial, plain, unsoftened 300 gauge regenerated cellulose film, prepared by casting a standard cellophane viscose (8.5% cellulose, 5.25% alkali, 28.2% carbon disulfide) at a salt index of 2.7±0.2 in a standard coagulating and regenerating bath containing 12% sulfuric acid and 18% sodium sulfate. The impact strength was measured by the pendulum method.

Table I

PROPERTIES OF FILMS AT 50% RELATIVE HUMIDITY AND 23° C.

| Film | Dry Tear (g./mil) | Wet Tear/ Dry Thickness (g./mil) | Impact (ft. lb./in.) |
|---|---|---|---|
| HX, unsoftened | 10.6/1 | 14.3/1.2 | 312 |
| Laboratory Control | 2.3/1 | 6.1/0.9 | 218 |
| Commercial Control A | 2.3/1 | 5/1 | 95–105 |

It will be apparent that the film prepared according to this invention had remarkably improved toughness as compared with a film prepared in the same manner but with relatively low carbon disulfide viscose cast in the usual ripened stage, and as compared with a standard regenerated cellulose film.

EXAMPLE II

The toughness of films prepared according to this invention was compared with that of commercial regenerated cellulose films under conditions of low relative humidity and high temperature.

A film was made as in Example I, from a viscose containing 8.5% cellulose and 5.25% alkali, prepared using 38% carbon disulfide based on the bone-dry cellulose. The viscose was cast at a salt index of 11.2 in a 40% ammonium sulfate coagulating bath at 50° C., then in a 10% sulfuric acid-25% sodium sulfate regenerating bath at 50° C. Softened and unsoftened films so obtained were tested at 29° C. and 15% relative humidity, in comparison with the "Commercial Control A" of Example I, unsoftened, and with another commercial regenerated cellulose film designated as "Commercial Control B." The latter was a 300 gauge moistureproof, heat-sealing regenerated cellulose film of better than average durability and flexibility, softened with 17% glycerol. The test values obtained with these films are shown in Table II below. In these tests, the impact strength was determined by the falling ball method. The film prepared according to this invention is designated as HX.

Table II

PROPERTIES OF FILMS AT 15% RELATIVE HUMIDITY AND 29° C.

| Film | Softener (percent glycerol) | Dry Tear (g./mil) | Flex/ Thickness (cycles/ mil) | Impact/ Thickness (kg. cm./ mil) |
|---|---|---|---|---|
| HX | 0 | 4.7/1 | 195/0.83 | 28.4/0.88 |
| Commercial Control A | 0 | 1.3/1 | 88/0.81 | 23.1/0.82 |
| HX | 17.8 | 9.2/1 | 417/0.95 | 29.4/0.92 |
| Commercial Control B | 17 | 3.2/1 | 319/0.89 | 31.9/0.90 |

EXAMPLE III

The toughness of films prepared according to this invention was compared with that of commercial regenerated cellulose films under conditions of very low temperature.

A film was made as in Example I from a viscose containing 8.5% cellulose and 5.25% alkali, prepared using 40% carbon disulfide based on the bone-dry cellulose. This viscose was cast at a salt index of 12.9 in a 40% ammonium sulfate bath, and the gel film was regenerated in a bath containing 10% sulfuric acid and 25% sodium sulfate. Softened and unsoftened films so obtained were tested at −18° C. (0° F.) and 35% relative humidity in comparison with the "Commercial Control A" of Example I, unsoftened, and with another commercial regenerated cellulose film, designated "Commercial Control C," which was a 300 gauge moistureproof film with an anchored water-resistant coating, having extra strong heat-sealing properties, highly flexible and durable, softened with 20% glycerol. The test values obtained with these films are shown in Table III below. In these tests, the impact strength was determined by the falling ball method. The film prepared according to this invention is designated as HX.

Table III

PROPERTIES OF FILMS AT 35% RELATIVE HUMIDITY AND −18° C.

| Film | Softener | Dry Tear (g./ mil) | Flex/ Thickness (cycles/ mil) | Impact/ Thickness (kg. cm./ mil) |
|---|---|---|---|---|
| HX | 0 | 3.2/1 | 223/0.99 | 28.5/1 |
| Commercial Control A | 0 | 2.4/1 | 65/0.96 | 14.3/0.97 |
| HX | 19.5% glycerol | 9.2/1 | 533/1.22 | 28.5/1.29 |
| Commercial Control C | 20% glycerol | 2.5/1 | 114/0.98 | 17.8/0.98 |

It will be seen that the unsoftened film of this invention is superior, under these conditions, not only to an unsoftened commercial film, but also to a softened commercial film.

EXAMPLE IV

A viscose containing 8.5% cellulose and 5.25% alkali was prepared, using 40% carbon disulfide based on the bone-dry cellulose, and cast at a salt index of 12.6 in a coagulating but non-regenerating bath consisting of an aqueous solution of 15% disodium monohydrogen phosphate and 15% monosodium dihydrogen phosphate. This bath, which had a pH of 6.0, was kept at 50° C. The film was then regenerated in a 10% sulfuric acid-25% sodium sulfate bath. It had a tear strength of 12.6 g./mil and an impact strength of 217 ft. lb./in., both measured at 23° C. and 50% relative humidity, and had a slight surface haze.

EXAMPLE V

Example IV was repeated except that the coagulating bath contained 10% disodium monohydrogen phosphate and 20% monosodium dihydrogen phosphate and had a pH of 5.3. The film had a tear strength of 11 g./mil at 23° C. and 50% relative humidity, and had a slight surface haze.

EXAMPLE VI

As has been stated, it is necessary in order to realize the benefits of this invention as regards film toughness and durability that the viscose be cast at a salt index between about 10 and about 15. In this example, toughness data are given on films from viscoses of uniform composition, but plate cast at salt indices varying within the stated range. It will be seen that all these viscoses gave films of superior toughness.

In all cases, the viscose contained 8.5% cellulose and 5.25% alkali, was prepared with 40% carbon disulfide based on the cellulose, and was cast as described in Example I. Table IV below shows the film properties obtained at various salt indices. The impact strength was measured by the pendulum method.

*Table IV*

PROPERTIES OF FILMS AT 50% RELATIVE HUMIDITY AND 23° C.

| Salt Index | Dry Tear (g./mil) | Wet Tear/Dry Thickness (g./mil) | Impact (ft. lb./in.) |
|---|---|---|---|
| 11.8 | 8.2/1 | 10.7/1.1 | 274 |
| 13.5 | 10.6/1 | 14.3/1.2 | 312 |
| 13.8 | 8.8/1 | 12.0/1.1 | 190 |
| 14.3 | 11.3/1 | | 386 |

All of the films so obtained had excellent clarity, except for a very slight surface haze with the last two films. In comparison, a similar viscose cast in the same manner, but at a salt index of 7.7, had a tear strength of only 3.5 g./mil and an impact strength of 224 ft. lb./in.

EXAMPLE VII

It has also been stated that the remarkable properties of the films of this invention are obtained when the viscoses from which they are cast are prepared with high amounts of carbon disulfide, from 35 to 50 based on the weight of the bone-dry cellulose. In this example, toughness data are given on films cast from viscoses ripened to the required salt index and containing identical amounts of cellulose and alkali, but amounts of carbon disulfide which vary above the stated minimum. It will be seen that all of these viscoses gave films of superior toughness.

In all cases, the viscose contained 8.5% cellulose and 5.25% alkali, was prepared with the indicated amount of carbon disulfide and cast at the indicated salt index, following the procedure of Example I. Table V shows the film properties. The impact strength was measured by the pendulum method.

*Table V*

PROPERTIES OF FILMS AT 50% RELATIVE HUMIDITY AND 23° C.

| Salt Index | Percent CS$_2$ | Dry Tear (g./mil) | Wet Tear/Dry Thickness (g./mil) | Impact (ft. lb./in.) |
|---|---|---|---|---|
| 9.9 | 35 | 7.5/1 | 8.9/1.0 | 213 |
| 12.5 | 38 | 10.1/1 | | 430 |
| 13.5 | 40 | 10.6/1 | 14.3/1.2 | 312 |
| 13.0 | 42 | 10.9/1 | 12.4/1.2 | 381 |
| 12.3 | 45 | 8.7/1 | 9.4/1.0 | 245 |
| 12.2 | 50 | 8.1/1 | 10.2/1.0 | 171 |

All of the above films were characterized by excellent clarity.

EXAMPLE VIII

Provided the stated limitations as to carbon disulfide content and salt index are observed, the other important factors in viscose composition, viz., alkali concentration and cellulose concentration, can be varied over the entire range recognized as practicable in the regenerated cellulose film art. In this example, there are given toughness data on films cast from a number of viscoses of varying alkali and cellulose concentration. These viscoses were prepared as described above, using the amounts of alkali and cellulose stated in Table VI below, and cast at the stated salt index into the two-bath system described in Example I. In all of the experiments tabulated, the amount of carbon disulfide in the viscose was 40% by weight of the bone-dry cellulose. The table indicates that in all cases films of remarkably high toughness were obtained. In addition, these films had excellent clarity, except for a slight surface haze in one or two cases. The impact strength was measured by the pendulum method.

*Table VI*

PROPERTIES OF FILMS AT 50% RELATIVE HUMIDITY AND 23° C.

| Percent NaOH | Percent Cellulose | Salt Index | Dry Tear (g./mil) | Impact (ft. lb./in.) |
|---|---|---|---|---|
| 4.3 | 8.5 | 13.0 | 11.2/1 | 172 |
| 7.3 | 8.5 | 13.0 | 10.3/1 | 237 |
| 8.5 | 8.5 | 14.8 | 10.7/1 | 339 |
| 10.0 | 8.5 | 14.8 | 9.7/1 | 364 |
| 5.25 | 9.0 | 12.3 | 14.1/1 | 314 |
| 5.25 | 9.5 | 13.3 | 16.2/1 | 345 |
| 5.9 | 9.5 | 13.0 | 11.9/1 | 274 |
| 8.1 | 9.5 | 13.5 | 11.4/1 | 444 |

*Example IX*

Xanthate was prepared from alkali cellulose containing 32–33% cellulose and 15% sodium hydroxide, using 45.3–45.7% carbon disulfide (based on the weight of bone-dry cellulose) at a temperature between 26° and 31° C. in a vented system. Viscose was prepared from the resulting xanthate, sodium hydroxide, and water in proper proportions to give a product containing 8.5–8.7% cellulose, and 5.1–5.4% sodium hydroxide, and was then aged at 15–18° C. until the salt index dropped to a value between 12 and 12.5.

Film was prepared by casting the viscose at the indicated salt index on a continuous casting machine, the viscose being continuously extruded into a primary aqueous bath maintained at a temperature of from 40° to 50° C., and containing 40% ammonium sulfate and sufficient Nacconol NR (a sodium alkyl aryl sulfonate) to reduce its surface tension to 30 dynes per centimeter. The fresh bath had an initial pH of 3–4; but after a short period of use, the pH rose to 7–8 and remained at this value. The coagulated film was then continuously passed into a secondary aqueous bath also maintained at a temperature of 40°–50° C., and containing 12% sulfuric acid and 20% sodium sulfate. The film was thereafter purified, softened, and dried in conventional fashion to produce a regenerated cellulose film (identified in the following table as HX film) of 300 gauge. Test values for this film, at 35% relative humidity, in comparison with commercial regenerated cellulose film designated "Commercial Control" which was a 300 gauge, moistureproof, heat-sealable film, are given in the following table:

*Table VII*

PROPERTIES OF FILMS AT 35% RELATIVE HUMIDITY

| Film | Tear (g./mil) | | Elongation (percent) | | Tenacity (kg.) | | Impact/Thickness (kg. cm./mil) |
| --- | --- | --- | --- | --- | --- | --- | --- |
| | TD [1] | MD [2] | TD | MD | TD | MD | |
| HX | 12.4 | 6.7 | 37.9 | 26.4 | 13.7 | 20.4 | 8.4/1 |
| Commercial Control | 2.5 | 2.0 | 26.4 | 14.7 | 10.5 | 14.0 | 3.3/1 |

[1] Transverse direction.
[2] Machine direction.

The products of this invention exhibit much lower primary gel swelling and lateral ordering to X-ray diffraction than normal cellophane, as shown in the tabulation below. These data indicate that these films have a dense, compact gel structure and relatively small and/or imperfect organized regions, characteristics which are believed to be necessary for tough, durable cellulosic structures. The films of this invention also have lower selective uniplanar orientation than normal cellophanes, indicating a relatively slower rate of interchain ordering of the cellulose molecules during coagulation.

The gel swellings are measured by removing a section of the film from the coagulating or regenerating bath, blotting to remove excess bath liquor and weighing the gel film. Bath salts are then washed out of the film after regeneration if necessary and the cellulose dried and weighed. Swellings are expressed as the ratio of the weight of the cellulose swollen by the bath to that of recovered dry cellulose.

Lateral order is determined from flat plate X-ray diffraction patterns, taken with 5 cm. specimen-to-film distance and using copper $K_a$ radiation. $W_1$ is the radial width of the 101 interference, measured between positions of half maximum intensity relative to the minimum intensity at a position midway between the equator and meridian of the pattern arbitrarily set at zero. $A_1$ is the azimuthal length of the 101 interference in degrees, also measured between positions of half maximum intensity.

*Table VIII*

GEL SWELLING OF FILMS CAST FROM HIGHLY XANTHATED VISCOSES

| Cellulose—NaOH—CS$_2$ | Salt Index | Gel Swelling | |
| --- | --- | --- | --- |
| | | From 1st Bath 40% $(NH_4)_2SO_4$ | From 2nd Bath 10% $H_2SO_4$—25% $Na_2SO_4$ |
| 8.5—5.25—28.2 (control) | 3.1 | 6.7 | 5.2 |
| 7—6—40 | 11.6 | 4.5 | 4.3 |
| 8—6—40 | 11.6 | 4.2 | 3.8 |
| 8.5—5.25—40 | 13.0 | 3.8 | 3.5 |
| 8.5—5.25—40 | 12.8 | 3.7 | 3.4 |

*Table IX*

X-RAY STRUCTURE OF FILMS CAST FROM HIGHLY XANTHATED VISCOSES

| Viscose (Cellulose—NaOH—CS$_2$) | Salt Index | Selective Uniplanar Orientation (180/$A_1$) | Lateral Order (1/$W_1$) |
| --- | --- | --- | --- |
| 8.5—5.25—28.2 (control) | 2.4 | 5.3 | 0.33 |
| 8.5—5.25—40 | 12.8 | 4.2 | 0.21 |

Another property that distinguishes the films of this invention from conventional cellophane films is their high oxygen permeability, a desirable characteristic when the film is to be used as wrapping for certain foods such as meat or fish. The following table shows the oxygen permeability of an unsoftened film prepared according to this invention in comparison with control films. The oxygen permeability was determined, using oxygen saturated with moisture at 23° C. on one side of the film and a pressure of 1 mm. of mercury on the other side, according to the method described by L. C. Cartwright in Anal. Chem. 19, 393 (1947). In the table below, both the highly xanthated viscose and the viscose designated "Laboratory Control" were cast in a system comprising first a 40% ammonium sulfate bath, then a 10% sulfuric acid-25% sodium sulfate bath as in Example I. The "Commercial Control A" was the same as that of Example I.

*Table X*

OXYGEN PERMEABILITY OF REGENERATED CELLULOSE FILMS

| Viscose (Cellulose—NaOH—CS$_2$) | Salt Index | Film Thickness (mils) | Oxygen Permeability (g./100 sq. m./hr.) | |
| --- | --- | --- | --- | --- |
| | | | Uncorrected | Corrected [1] |
| 8.5—5.25—40 | 12.0 | 1.1 | 12.5 | 13.8 |
| 8.5—5.25—28.2 (Laboratory Control) | 2.9 | 1.0 | 6.7 | 6.7 |
| Commercial Control A | | 1.0 | 7.8 | 7.8 |

[1] On the basis that permeability is inversely proportional to thickness.

EXAMPLE X

The properties of a film prepared according to the present invention are compared with those of a film prepared using a similar two-bath system but wherein a stretch of 25% was imparted during regeneration.

A viscose was prepared in accordance with the procedure described for Examples I–VIII using 40% carbon disulfide based on the weight of the dry cellulose. The viscose was ripened to a salt index of 12.0 and cast into an aqueous buffer solution buffered to a pH of at least 3 containing 1600 grams ammonium sulfate, 6 grams sodium hydroxide, and 2400 grams water to coagulate without substantially regenerating the viscose film. Thereafter, the viscose film was subjected to an acid-salt bath containing 400 grams sulfuric acid, 1000 grams sodium sulfate and 2600 grams water without applying any substantial stretch to the film to form a regenerated cellulose film. This film and the control film were softened in glycerin to give 13–15% softener in the dry film.

As a control, the same viscose, prepared with 40% carbon disulfide based on the weight of the dry cellulose and having a salt index of 12.0, was cast into the same aqueous buffer solution buffered to a pH of at least 3 containing 1600 grams ammonium sulfate, 6 grams sodium hydroxide and 2400 grams water to coagulate without substantially regenerating the viscose film. Thereafter, the viscose film was subjected to the acid-salt bath containing 400 grams sulfuric acid, 1000 grams sodium sulfate and 2600 grams water while simultaneously a stretch of 25% in the machine direction was applied to the film to form a regenerated cellulose film.

The properties of the two films are compared in Table XI below:

*Table XI*

| Example | Stress-Flex (cycles) | Tear Resistance | |
| --- | --- | --- | --- |
| | | Transverse Direction (grams) | Machine Direction (grams) |
| X | 20.3 | 6.6 | 6.0 |
| Control | 7.0 | 5.8 | 4.4 |

In view of their high durability and outstanding tear strength even in very thin sheets, the cellulose films obtainable by the present invention are useful for heavy duty wraps of all kinds, such as, for example, for wrapping heavy machine parts having sharp corners, sharp utensils, instruments, food such as fish, meat, dried vegetables, bread, cereals, and the like. They are also useful in tablecloths, aprons, floor coverings, and in laminates with other materials in thin sheets for extra heavy duty.

I claim:

1. The process which comprises casting a film of viscose prepared with about 35% to about 50% carbon disulfide based on the weight of the dry cellulose and having a salt index between about 10 and about 15 into an aqueous buffer solution buffered to a pH of at least 3, to coagulate without substantially regenerating the viscose film, and thereafter subjecting said film, without substantially stretching said film, to the action of an acid-salt bath effective to regenerate the cellulose whereby to form a regenerated cellulose film characterized by high tear resistance and high durability under conditions of low temperature and low humidity.

2. The process of claim 1 wherein the viscose contains from about 7% to about 10% by weight of cellulose.

3. The process of claim 2 wherein the viscose is prepared with from 42% to 48% by weight of carbon disulfide.

4. The process of claim 2 wherein the viscose has a salt index of not more than about 12.5.

5. The process of claim 2 wherein said aqueous buffer solution is buffered to a pH of from 7 to 9.

6. The process which comprises casting a film of viscose prepared with from about 35% to about 50% by weight of carbon disulfide based on the weight of the dry cellulose and having a salt index of from 11.5 to 13 into an aqueous buffer solution buffered to a pH of from 7 to 9, to coagulate without substantially regenerating the viscose film, and thereafter subjecting said film, without substantially stretching said film, to the action of an acid-salt bath effective to regenerate the cellulose whereby to form a regenerated cellulose film characterized by high tear resistance and high durability under conditions of low temperature and low humidity.

7. The process which comprises continuously casting a film of viscose prepared with from 42% to 48% by weight of carbon disulfide based on the weight of the dry cellulose and having a salt index of from 11.5 to 12.5 into an aqueous buffer solution buffered to a pH of from 7 to 9, said bath containing an anionic wetting agent, and maintained at a temperature of from 30° to 50° C., to coagulate without substantially regenerating the viscose film, and thereafter subjecting said film, without substantially stretching said film, to the action of an acid-salt bath effective to regenerate the cellulose whereby to form a regenerated cellulose film characterized by high tear resistance and high durability under conditions of low temperature and low humidity.

8. The process of claim 2 wherein the aqueous buffer solution contains more than 25% of buffering agent.

References Cited in the file of this patent

UNITED STATES PATENTS

| | | |
|---|---|---|
| 2,144,356 | Alles | Jan. 17, 1939 |
| 2,297,746 | Charch et al. | Oct. 6, 1942 |
| 2,313,520 | Czapek | Mar. 9, 1943 |
| 2,338,182 | Hutchinson | Jan. 4, 1944 |
| 2,412,969 | Cramer | Dec. 24, 1946 |
| 2,422,021 | Kline | June 10, 1947 |
| 2,581,835 | Cox | Jan. 8, 1952 |

FOREIGN PATENTS

| | | |
|---|---|---|
| 648,865 | Great Britain | Jan. 17, 1951 |

UNITED STATES PATENT OFFICE

CERTIFICATE OF CORRECTION

Patent No. 2,991,510            July 11, 1961

Henry Gilbert Ingersoll

It is hereby certified that error appears in the above numbered patent requiring correction and that the said Letters Patent should read as corrected below.

Column 1, line 14, for "Serial No. 474,424" read -- Serial No. 447,424 --; column 5, line 20, for "con" read -- can --; line 21, for "byy" read -- by --.

Signed and sealed this 15th day of May 1962.

(SEAL)
Attest:

ERNEST W. SWIDER
Attesting Officer

DAVID L. LADD
Commissioner of Patents